Dec. 24, 1946. P. K. CHATTERJEA ET AL 2,412,963
ARRANGEMENT FOR DETERMINING AND MONITORING THE
DURATION OF ELECTRICAL PULSES
Filed June 12, 1943
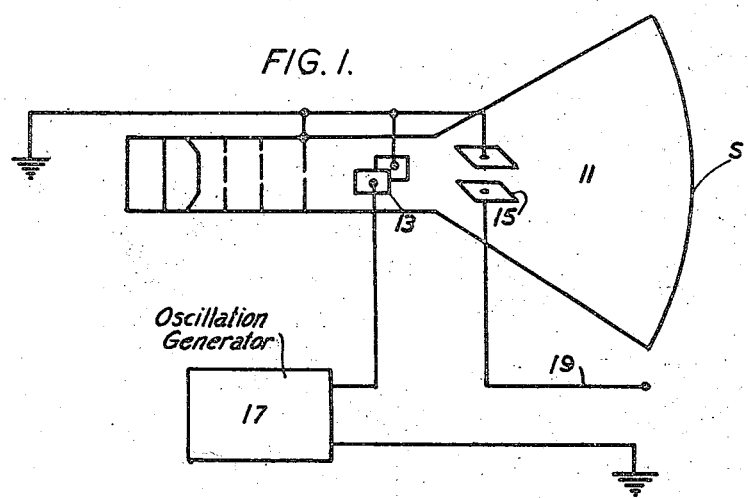
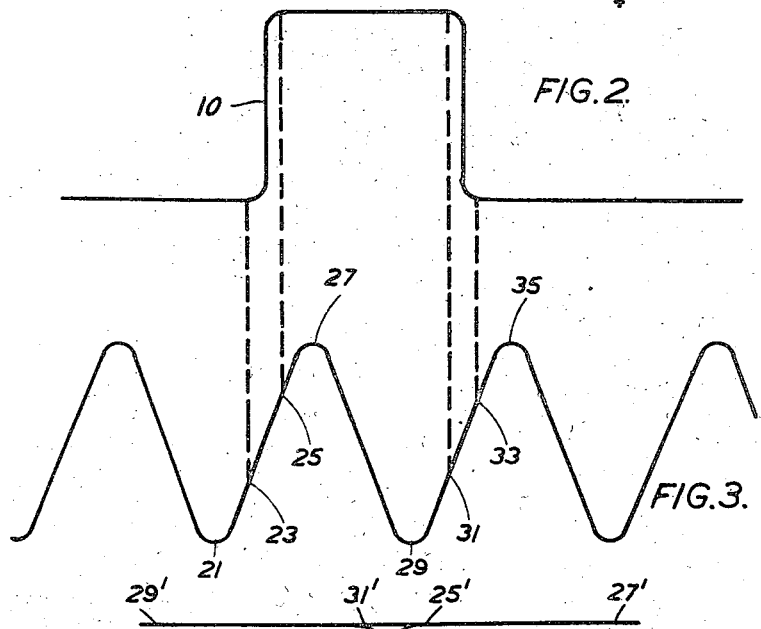
Inventors
Prafulla Kumar Chatterjea
Charles Thomas Scully
Dermot Nia Ambrose
By
Attorney Patented Dec. 24, 1946

2,412,963

UNITED STATES PATENT OFFICE 2,412,963

ARRANGEMENT FOR DETERMINING AND MONITORING THE DURATION OF ELECTRICAL PULSES

Prafulla Kumar Chatterjea, Charles Thomas Scully, and Dermot Min Ambrose, London, England, assignors to Standard Telephones and Cables Limited, London, England, a British company Application June 12, 1943, Serial No. 490,574
In Great Britain July 21, 1942

5 Claims. (Cl. 161—15)

The present invention relates to a method of and arrangements for determining or monitoring the duration of electrical pulses.

Methods of estimating pulse width normally employed are either direct measurement of the pulse width as compared with the repetition time of the pulses on the screen of a cathode ray oscilloscope or by using an oscilloscope with a circular trace and applying the pulse to the grid of the cathode ray tube and so blanking out a section of the trace during the pulse period. Thus, if the speed of the circular sweep is known then the duration of the blanked out section may be determined.

The first of these methods cannot be used practically when the pulse duration is small and/or when the repetition time is small while the second tends to become expensive in special apparatus.

According to one aspect of the present invention, the method of determining the duration of electrical pulses comprises generating oscillations, comparing the oscillation period against the pulse duration and varying the frequency of the generated oscillations until the oscillation period is equal to the pulse duration.

According to another aspect of the invention, a method of determining the duration of electrical pulses comprises generating oscillations having a period equal to the pulse duration.

The method of monitoring the duration of electrical pulses according to the present invention comprises comparing the duration of said pulses against the period of oscillation of known constant frequency.

From another aspect, the method of monitoring the duration of electrical pulses according to the present invention comprises generating oscillations of fixed frequency whose period is equal to the desired pulse duration, comparing the pulse duration against the oscillation period and adjusting the pulse duration until the said duration is equal to the said period.

In the method described below the only apparatus required is a cathode ray tube which is capable of producing a spot on the screen and an oscillation generator of variable frequency sufficient to cover the frequency of period equal to the duration of the pulse. For instance, if the pulse duration is X micro-seconds the frequency having this period would be $$\frac{1}{x \times 10^{-6}} = \frac{10^6}{x}$$

cycles/second and the oscillation generator would have to be capable of producing this frequency.

Figure 1 is a diagram showing the circuit connections to the cathode ray tube.

Figure 2 shows the form of the pulses which are to be measured and which are applied to the vertical deflector plates.

Figure 3 shows the sine wave which is applied to the horizontal deflector plates.

Figure 4 shows the composite trace which appears on the screen of the tube.

The circuit for the apparatus is shown in Fig. 1. The cathode ray tube 11 with X-deflector plates 13 and Y-deflector plates 15 is connected by any known means to a power supply, not shown, in such a manner as to produce a focussed spot on the screen at S. One X-deflector plate 13 is connected to an oscillation generator 17, while one Y-deflector plate 15 is connected via lead 19 to the source of the pulses whose duration it is required to determine.

The other X and Y plates are bonded to ground or some similar fixed datum voltage level.

The pulses are thus on the vertical deflector plates while the sine wave oscillations from the generator 17 are on the horizontal deflector plates. Figures such as are shown in Fig. 4 will then be obtained under certain conditions as will now be described.

The explanation of the figures produced on the cathode-ray tube screen when the frequency of the oscillation generator is adjusted to have the same period as the pulse duration will be given in conjunction with the Figures 2, 3 and 4.

Figures 2 and 3 represent the pulse 10 and the wave-form generated in 17 respectively drawn to the same time scales. Figure 4 shows the diagram as produced on the cathode-ray tube. (The scales in this figure (Fig. 4) bear no reference to the scales in Figures 2 and 3.)

At the start of a cycle point 21 the spot on the cathode ray tube is at point 21' and moves so that at 23' it coincides with point 23 in Fig. 3. This is, with reference to Fig. 2, the start of the rise of the pulse which continues its rise to point 25 when the spot has now travelled vertically to point 25'. From here the spot performs almost a quarter of a cycle to point 27' corresponding to 27 and from thence over a half cycle to 29' and a further quarter cycle to point 31' corresponding to point 31. Thus from point 25' to 31' which is practically a complete cycle the spot has no change in its vertical deflection.

At point 31' and 31 the end of the pulse is reached and the spot falls to point 33' corresponding to 33 and travels to point 35' thus completing a cycle and one half from point 21'. Until the next pulse occurs the spot now oscillates between points 21' and 35' with no change in its vertical deflection.

It is to be noted that between points 23 and 31 or 25 and 33 one complete cycle is traced. Thus when the figure on the screen is adjusted so that the two vertical lines 23' to 25' and 31' to 33' as nearly as possible coincide the duration of the pulse is the same as the duration of one cycle of the generated wave in Fig. 3. Thus if the frequency of the wave in Fig. 3 is $f$ cycles/second the duration of the pulse is $$\frac{1}{f}$$

seconds or $$\frac{10^6}{f}$$

micro-seconds.

The vertical line 37 which is composed of the two traces 23', 25' and 31', 33' may not appear in the centre of the traces 29', 27' and 21', 35' but may occur anywhere along these lines dependent upon the phase relationship of the two wave forms. The result is not affected by this movement so long as the two vertical traces coincide.

To facilitate the initial adjustment of these figures obtained on the cathode ray tube screen it may be found desirable to apply the pulses as a small synchronising signal to the oscillation generator by any known arrangements but should afterwards be removed as the synchronising will tend to change the frequency of the generated wave to a slight extent.

Besides using these arrangements for measuring pulse duration, they may also be used to monitor a pulse whose duration is desired to be kept constant. In this case the generated oscillation is fixed at the frequency having the period of the required pulse duration and the pulse width altered to make the lines 23', 25' and 31', 33' Fig. 4 coincide.

What is claimed is:

1. Apparatus for determining the duration of the pulses of a source of rectangular voltage pulses having a predetermined frequency comprising a cathode ray tube oscillograph, means for focussing the cathode beam on the fluorescent screen thereof, two pairs of perpendicularly related deflection elements, a source of sinusoidal electrical waves of a predetermined frequency, means for applying said source of rectangular voltage pulses to one pair of said deflection elements, means for applying said sinusoidal electrical waves to said other pair of deflection elements, and means for comparing the width of said rectangular voltage pulses with the frequency of said sinusoidal electrical waves comprising means for adjusting the frequency of said sinusoidal electrical waves.

2. Method of determining the duration of the pulses of a source of rectangular voltage pulses by means of a cathode ray oscillograph having means for producing a cathode ray beam, perpendicularly related first and second deflection elements and a fluorescent screen, which comprises impressing said rectangular voltage pulses on said first deflection elements, impressing sinusoidal electrical waves of a predetermined periodicity from another source on said second deflection elements and determining the duration of said rectangular pulses by adjusting the periodicity of said sinusoidal electrical waves until the form of the luminous trace produced on said fluorescent screen coincides with a predetermined pattern.

3. The method of determining the duration of the pulses from a source of rectangular voltage pulses by means of a cathode ray oscillograph having means for producing a cathode ray beam, perpendicularly related first and second deflection elements, and a fluorescent screen which comprises applying said pulses from said source to said first deflection elements whereby the voltage changes at the leading and trailing edges of each pulse will produce traces across said fluorescent screen, applying a sinusoidal voltage to said second deflection elements, adjusting the periodicity of said voltage until said traces coincide, and thereafter determining the pulse duration by the frequency of said sinusoidal voltage.

4. Means for determining the duration of rectangular electrical pulses having a predetermined frequency, comprising a cathode ray oscillograph having sets of deflection plates, and a source of sinusoidal electrical signals, means for applying the predetermined sinusoidal electrical signals to one set of deflection plates, means for applying the rectangular electrical pulses to another set of deflection plates, and means for adjusting the frequency of the sinusoidal electrical signals whereby a trace coinciding with a predetermined pattern is obtained.

5. Means for determining the duration of rectangular electrical pulses comprising a cathode ray oscillograph having sets of deflection plates and a source of sinusoidal electrical signals, means for applying the sinusoidal electrical signals to one set of deflection plates, means for applying the rectangular electrical pulses to another set of deflection plates, and means for adjusting said rectangular electrical pulse width independently of the sinusoidal electrical signals to produce a trace coinciding with a predetermined pattern.

PRAFULLA KUMAR CHATTERJEA.
CHARLES THOMAS SCULLY.
DERMOT MIN AMBROSE.